(12) United States Patent
DeGrace

(10) Patent No.: US 9,130,361 B2
(45) Date of Patent: Sep. 8, 2015

(54) CYCLONIC STRIPPING BLADE

(71) Applicant: Mechtrix Corporation, Menomonee Falls, WI (US)

(72) Inventor: William L. DeGrace, Germantown, WI (US)

(73) Assignee: Mechtrix Corporation, Menomonee Falls, WI (US)

( * ) Notice: Subject to any disclaimer, the term of this patent is extended or adjusted under 35 U.S.C. 154(b) by 0 days.

(21) Appl. No.: 14/273,775

(22) Filed: May 9, 2014

(65) Prior Publication Data

US 2014/0305269 A1 Oct. 16, 2014

Related U.S. Application Data

(63) Continuation of application No. 12/908,204, filed on Oct. 20, 2010, now Pat. No. 8,739,665.

(60) Provisional application No. 61/253,531, filed on Oct. 21, 2009.

(51) Int. Cl.
*B26D 1/00* (2006.01)
*B26D 1/02* (2006.01)
*H02G 1/12* (2006.01)

(52) U.S. Cl.
CPC .......... *H02G 1/1236* (2013.01); *H02G 1/1209* (2013.01); *H02G 1/1253* (2013.01); *H02G 1/1258* (2013.01); *Y10T 29/49117* (2015.01); *Y10T 83/04* (2015.04)

(58) Field of Classification Search
USPC ............ 30/357, 353, 351, 90.1, 91.2; 83/947, 83/857, 13; 81/9.4, 9.44
See application file for complete search history.

(56) References Cited

U.S. PATENT DOCUMENTS

| | | | |
|---|---|---|---|
| 3,527,124 A | 9/1970 | Ullman | |
| 4,370,808 A | 2/1983 | Maytham | |
| 4,577,405 A | 3/1986 | Butler | |
| 4,630,406 A * | 12/1986 | Butler | ............................ 451/45 |
| 4,852,433 A | 8/1989 | Butler | |
| 4,972,582 A | 11/1990 | Butler | |
| 5,025,687 A | 6/1991 | Butler | |
| 5,414,931 A | 5/1995 | Wollermann | |
| 5,517,882 A | 5/1996 | Hoffa | |
| 5,613,904 A * | 3/1997 | LaSalle et al. | .................... 452/6 |
| 5,638,602 A | 6/1997 | Wilhelm | |
| D386,362 S * | 11/1997 | LaSalle et al. | ................. D7/693 |
| 5,924,200 A | 7/1999 | College | |
| 6,094,821 A | 8/2000 | College et al. | |
| 7,367,876 B1 * | 5/2008 | Denoff | ............................. 452/2 |
| 2002/0026711 A1 * | 3/2002 | Edwards et al. | .............. 30/90.1 |
| 2004/0004058 A1 | 1/2004 | Staider | |

* cited by examiner

*Primary Examiner* — Omar Flores Sanchez
(74) *Attorney, Agent, or Firm* — Boyle Fredrickson, S.C.

(57) ABSTRACT

A blade assembly is provided for use in a wire stripping system, where the blade assembly includes a first blade including a first cutting opening therein, the first opening including a first guide surface on one side of the first opening and a first cutting surface on the opposite side of the first opening, and a second blade including a second cutting opening therein, the second opening including a second guide surface on one side of the second opening and a second cutting surface on the opposite side of the second opening. The blades impart a rotation force on the wire to cause the cutting surfaces to make a depth-controlled circumferential cut in the sheath around the entire wire.

2 Claims, 4 Drawing Sheets

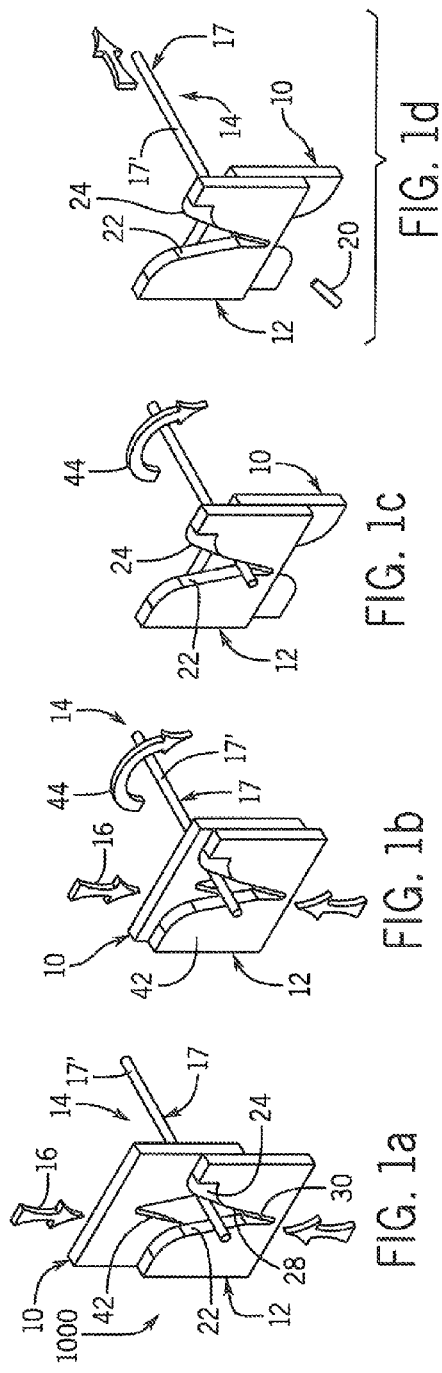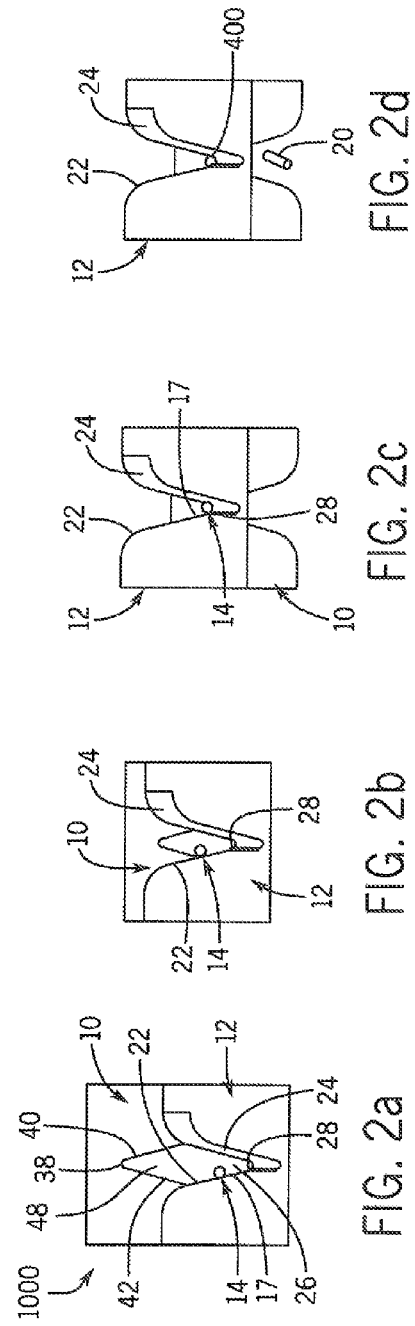

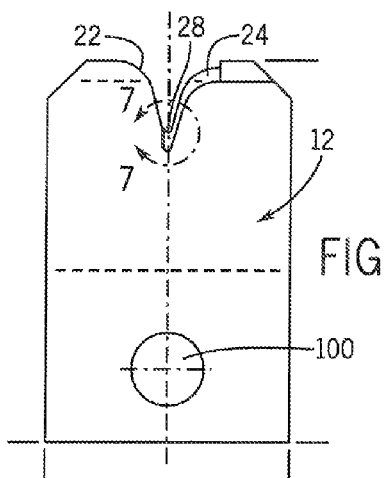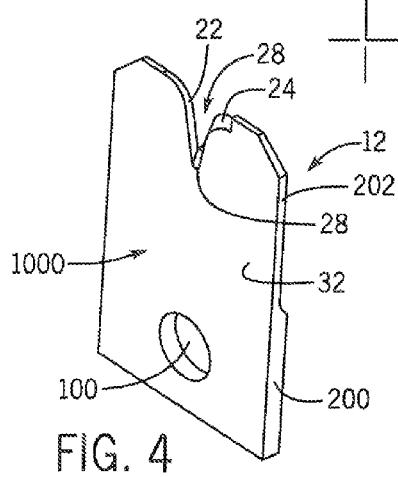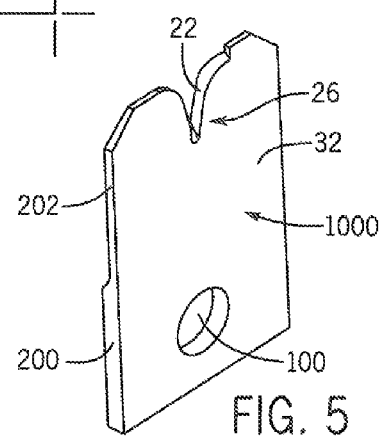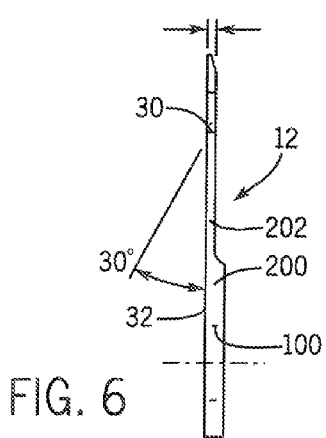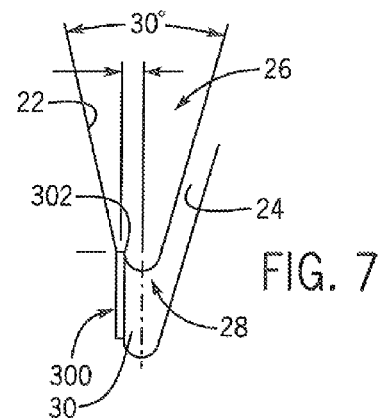

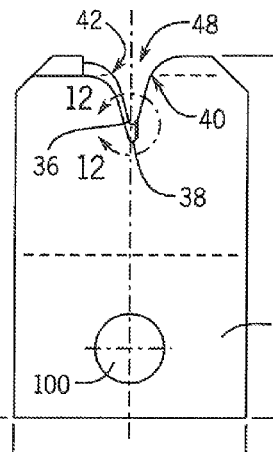
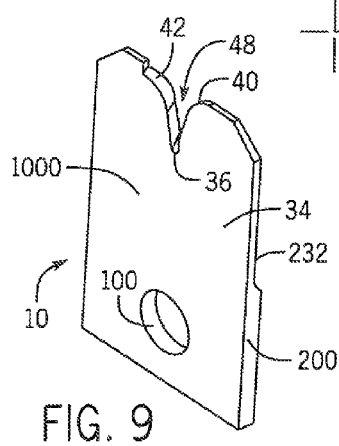
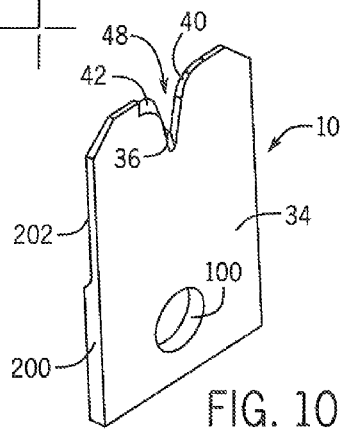
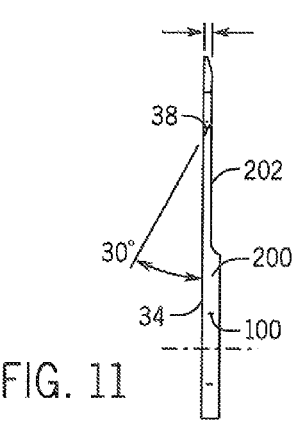
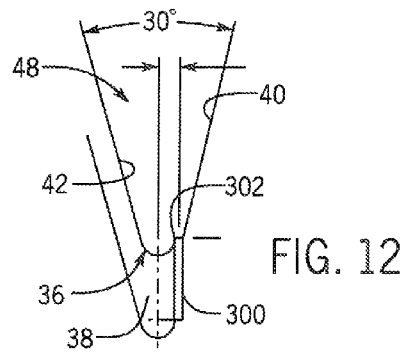
FIG. 8
FIG. 9
FIG. 10
FIG. 11
FIG. 12

CYCLONIC STRIPPING BLADE

CROSS-REFERENCE TO RELATED APPLICATIONS

This application claims priority as a continuation of U.S. Non-Provisional application Ser. No. 12/908,204 filed on Oct. 20, 2010, now U.S. Pat. No. 8,739,665, which in turn claims priority from U.S. Provisional Application Ser. No. 61/253,531, filed on Oct. 21, 2009, the entirety of which are each hereby expressly incorporated by reference herein.

FIELD OF THE INVENTION

The present invention relates to machines utilized in the manufacture of electronic devices, and more particularly to machines utilized to strip the insulating coating from wires used in the construction of the electronic and electrical devices.

BACKGROUND OF THE INVENTION

In the manufacture of electronic devices, wiring of various types and sizes is required to complete the necessary electrical connection for proper operation of the device. The wires used in this manufacture as formed with a conductive core, normally formed from a type of metal, surrounded by an insulting material sheath. The insulating material sheath is formed to closely conform to the shape of the conductive core, and is formed of a material that is both electrically insulating, and durable to provide effective insulation to the wiring.

However, because the wiring formed in this manner is utilized for making electrical connections in various types of devices, during the manufacture of the devices it is necessary to expose the ends of the conductive core of the wiring in order to facilitate the construction of the device. Therefore, when wiring having an insulating material sheath is utilized, portions of the sheath usually must be removed.

In prior art devices developed for removing portions of the insulating sheath, blades are utilized to cut through the sheath material such that it can be stripped off of the conductive core. These blades were designed to utilize one of two cutting methods. In the first push cutting method, a pair of opposed blades are each formed with a generally flat cutting surface having a central notch formed therein. The notches are disposed in alignment with one another and are formed to have a radius approximately equal to the radius of the conductive core of the wiring being stripped. To remove the conductive sheath from the wiring, the wiring is positioned between the blades in alignment with the notches and the blades are moved towards each other. The cutting edges of the blades engage the insulating material sheath on both sides of the wiring and sever the portion to be removed from the remainder of the sheath. While the sheath material is being severed the conductive core is located within the notches to limit the contact of the cutting surfaces with the core.

One significant drawback with regard to this cutting method is that, while it is possible to control the depth of the cut through the sheath at the center of each notch in the cutting swine, the cutting surface on each end of the notch can insufficiently sever the sheath, as the sheath is squeezed between the opposed blades. Further, if the blades are compressed further to sever the squeezed sections of the sheath, this can nick the conductive core, thereby reducing the current carrying capacity of the core.

As an alternative to the push cutting blades and method, a second cutting and stripping method involves the use of V-shaped blades. In this method, the blades each have a V-shaped opening formed in the cutting surface of the blade, with the cutting edge running completely along the periphery of the opening. The opening terminates in a rounded end that corresponds generally in shape to the circumference of the wiring to be cut and stripped using the blades.

In operation, the wiring is positioned between the blades, and the blades are subsequently moved towards one another. The V-shape of the openings in the blades urges the wiring towards the rounded ends of each blade until the wiring is captured in the rounded ends. During the movement of the wiring towards the capture position and at this point, the cutting edges on the sides and rounded ends of the openings engage and cut into the insulating material sheath. As a result of the shape of the rounded ends of the openings, any contact of the cutting edges with the conductive core of the wiring is limited, to minimize any nicking of the conductive core by the cutting edges of the blades.

However, while the shape of the rounded ends of the openings attempts to minimize contact of the cutting edges with the conductive core of the wiring, similarly to the issues with the push cutting blades and method, the V-shape blades and method cannot effectively control the depth of the cut into the sheath, such nicks in the conductive core occur.

Therefore, it is desirable to develop a cutting blade and method for utilizing the blade that provides a controlled-depth cut into the insulating material sheath on a coated wire to minimize nicking or otherwise damaging the conductive core of the wiring.

SUMMARY OF THE INVENTION

Thus, according to one aspect of the present disclosure, a stripping blade is designed with specific geometry that features a single, compound cutting edge along one side of the stripping form with an opposing guiding surface along the adjacent edge that also mechanically defines the depth of the cut or insulation penetration. The bilateral symmetry of the guiding surface also creates a "cyclonic" or rotational force on the wiring that creates a complete 360° circumferential cut into the insulating material as the pair of stripping blades move relative to each other. The circumferential cutting minimizes the amount of insulating material that is squeezed and/or torn during the stripping or removal process and thus greatly reduces the amount of force required to perform the operation.

According to another aspect of the present disclosure, the stripping blade geometry features a unique stripping form geometry with bilateral symmetry and internal guiding. Further, the stripping blade includes a mechanically defined depth of insulation penetration and a cyclonic stripping action that slices, rather than pushes or compresses, into the insulating material, creating a superior cut.

Numerous other aspects, features and advantages of the present disclosure will be made apparent from the following detailed description taken together with the drawing figures.

BRIEF DESCRIPTION OF THE DRAWINGS

The drawings illustrate the best mode currently contemplated for practicing the present invention.

In the drawings:

FIGS. 1(a)-1(d) are isometric views of a the operation of the stripping blades to strip a portion of an insulating material sheath from a conductive core;

FIGS. 2(a)-2(d) are front plan views of the operation of the snipping blades corresponding to FIGS. 1(a)-1(d);

FIG. 3 is a front plan view of a first stripping blade constructed according to the present disclosure;

FIG. 4 is first isometric view of the blade of FIG. 3;

FIG. 5 is a second isometric view of the blade of FIG. 3;

FIG. 6 is a side plan view of the blade of FIG. 3;

FIG. 7 is a partially broken away, cross-sectional along line 7-7 of FIG. 3;

FIG. 8 is a front plan view of a complementary, second stripping blade constructed according to the present disclosure;

FIG. 9 is first isometric view of the blade of FIG. 8;

FIG. 10 is a second isometric view of the blade of FIG. 8;

FIG. 11 is a side plan view of the blade of FIG. 8;

FIG. 12 is a partially broken away, cross-sectional along line 12-12 of FIG. 8.

DETAILED DESCRIPTION OF THE INVENTION

Figure 13:
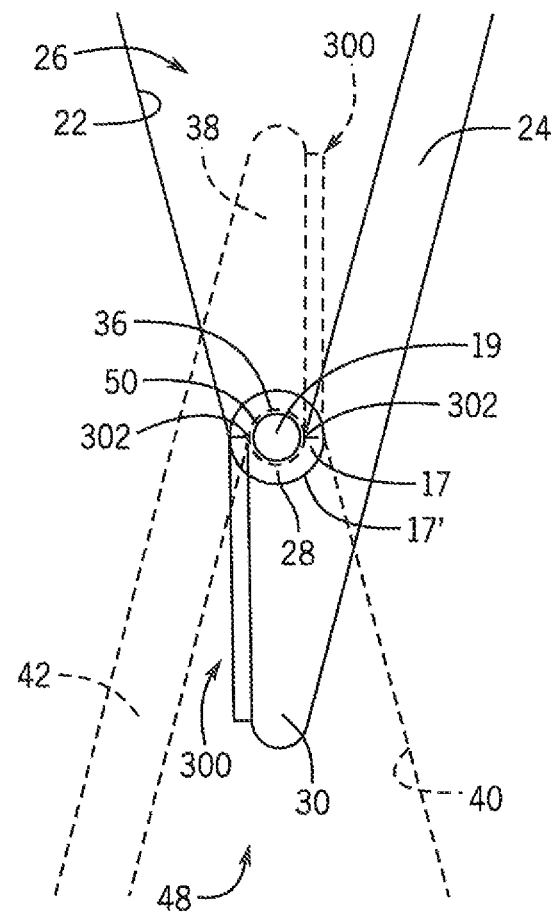
FIG. 13 is partially broken away, front plan view of the engagement of the first and second blades with a wire.

With reference now to the drawing figures in which like reference numerals designate like parts throughout the disclosure, a pair of stripping blades forming a blade assembly 1000 and constructed in accordance with the present disclosure is illustrated generally at 10 and 12 in FIGS. 1(a)-1(d). FIGS. 1(a)-1(d) illustrate the movement of the pair of stripping blades 10, 12 to remove the insulation from a portion of an insulated electrical cable 14. As the stripping blades 10, 12 move relative to each other, as illustrated by arrows 16, the configuration of the stripping blades 10, 12 slices through the insulation 17 disposed around the conductive metal wire core 19 and removes an end section 20 of the insulation 17. As shown in FIGS. 1(b) and 1(c), the blades 10, 12 sever only the insulation 17 surrounding the metallic wire core 19 within the cable 14 such that when the cable 14 is moved in the direction shown by arrow 18 in FIG. 1(d), the end section or slug 20 is stripped off of the metal wire core 19. The exposed end 21 of the wire core 19 can then make electrical contact with other components or connectors. The present disclosure is directed to the specific configuration of the pair of stripping blades 10, 12 shown in FIGS. 1(a)-1(d).

Referring now to FIGS. 2(a)-2(d) and 3, the stripping blade 12 is formed with a body 23 of a suitable material, such as a metal, and includes a mounting aperture 100 that receives a fastener (not shown) therein to secure the blade 12 to a device for moving the blade 12 during a cutting operation, and a smooth guide surface 22 and a cutting surface 24 that combine to define opposed sides of a V-shaped opening 26 spaced from the mounting aperture 100. The opening 26 in one embodiment is shaped with an angle of approximately 30°, though other angles for the opening 26 are contemplated as being within the scope of the disclosure, and terminates at a semicircular cutting edge 28, as best shown in FIG. 7. Positioned below the cutting edge 28 is a sloping lead-in surface 30. As illustrated in FIG. 6, the sloping lead-in surface 30 is positioned at an angle of approximately 30° relative to the generally planar face surface 32 of the cutting blade 12. The lead-in surface 30 provides edge strength to the cutting edge 28 to enable the cutting edge 28 to more easily sever the insulation 17 of the wiring or cable 14. Depending upon the particular wire wiring or cable 14 being cut, and the corresponding insulation 17 and/or wire core 19 therein, the lead-in surface 30 can be varied in shape to have an angle that provides the best edge strength to the cutting edge 28. The angle of the surface 30 can be varied from 15° to 45° relative to the generally planar face surface 32 of the cutting blade 12, but for the majority of wires 14 to be cut, and angle of between 20° to 30° relative to the generally planar face surface 32 of the cutting blade 12 is sufficient.

The stripping blade 10, as shown in FIGS. 8-12, is formed similarly and complementary to, and optionally as a mirror image of, the blade 12, and includes a planar face surface 34 and a similar semicircular cutting edge radius 36. The stripping blade 10 includes a sloping lead-in surface 38 that is also positioned at the same or a similar angle as the surface 30 on the blade 12, as shown in FIG. 11.

The stripping blade 10 shown in FIG. 8 also includes a cutting surface 42 and an opposite guide surface 40 that define the V-shaped opening 48. As can be understood in FIGS. 3 and 8, the cutting surface 24 formed on the stripping blade 12 is located on an opposite side from the cutting surface 42 contained on the stripping blade 10. Further, the cutting edge radius 28 shown in FIG. 7 and the cutting edge radius 36 shown in FIG. 12 correspond to each other and are sized dependent upon the type of cable or wire 14, and the corresponding thickness of the insulating material sheath 17 and conductive core 19 utilized with the stripping blades 10, 12.

Also, as best shown in FIGS. 6 and 11, the body 23 of each of the blades 10 and 12 is formed with a thicker portion 200, in which the mounting aperture 100 is located, and a thinner portion 202, in which the V-shaped openings 26 and 48 are disposed. The presence of the mounting aperture 100 in the thicker portion 200 provides the blades 10 and 12 with increased strength and rigidity around the mounting aperture 100. This enables the blades 10 and 12 to be securely mounted to a suitable device and withstand the stress applied to the blades 10 and 12 during operation of the device.

Further, the V-shaped openings 26 and 48 are disposed in the thinner portions 202 of each blade 10 and 12. The thinner portions 202 are configured to have a thickness approximately equal to one half of the thickness of the thicker portions 200, such that the blades 10 and 12 can be mounted to the device in a configuration where the thinner portions 202 of each blade 10 and 12 are aligned with at least a part of the thicker portion 200 of the opposing blade 10,12, to minimize the size of the blade pair in the mounted configuration on the device. Additionally, in this position, the thinner portions 202 can be disposed closely to one another, and optionally in sliding contact with one another, to facilitate the severing of the insulation slug 20 from the wire 14 by the openings 26 and 48 on each blade 10 and 12.

Referring back to FIGS. 1(a)-1(d) and 2(a)-2(d), when the stripping blades 10, 12 are moved relative to each other to strip a section or slug 20 of insulation 17 from the electrical cable 14, the electrical cable 14 is initially positioned between the blades 10 and 12 and held stationary as it contacts either the guide surface 22 of the stripping blade 12, or the guide surface 40 of the stripping blade 10, depending upon the orientation of the blades 10 and 12. As illustrated in the configuration shown in FIGS. 1(a) and 2(a), the guide surface 22 on the stripping blade 12 interacts with the cutting surface 42 of the stripping blade 10, while the cutting surface 24 of the stripping blade 12 interacts with the guide surface 40 of the stripping blade 10.

As can be understood in FIGS. 1(b), 1(c), 2(b) and 2(c), as the stripping blades 10, 12 move towards one another in the direction shown by arrows 16, the cutting surface 42 contacts the cable 14, which causes the cable 14 to rotate in the direction shown by arrow 44. Alternatively, by varying the position of the blades 10,12 and/or the wire 14, it is possible to cause the wire 14 to rotate in a counterclockwise direction, if desired. Further movement of the stripping blades 10 and 12 relative to each other causes the cable 14 to continue to rotate in the direction shown by arrow 44, which aids in urging the cutting surface 42 into the insulation 17 on the wire 14 as the wire 14 is rotating to create a depth-controlled circumferential cut through the exposed surface 17' of the insulation 17 on the electrical cable 14. The depth-control function of the blades 10 and 12 is provided by the engagement of the wire 14 by the guide surface 22, which prevents the cutting surface 42 from cutting too deeply into the sheath insulation material 17 as the wire 14 is rolled along the cutting surface 42.

The movement of the blades 10 and 12 and consequent rotation of the cable 14 continues until the blades 10 and 12 reach their fully engaged position shown in FIGS. 1(d) and 2(d). When the stripping blades 10, 12 are in the fully engaged position shown in FIGS. 1(d) and 2(d), the cutting edge radius 28 of the stripping blade 12 and the cutting edge radius 36 of stripping blade 10 combine to define a circular opening 50 having a diameter slightly larger than the diameter of the conductive core 19 of the wire 14. As illustrated in FIG. 13, the cutting edge radiuses 28, 36 sever the insulation 17 such that the slug 20 can be stripped from the insulation 17 remaining on the wire 14 when the wire 14 is moved in the direction shown by arrow 18 in FIG. 1(d).

To facilitate the removal of the slug 20, the blades 10 and 12 each have a stop 300 located within the V-shaped opening 26,48 at the intersection of the guide surface 22,40 with the cutting edge 28,36. The stop 300 includes a projection 302 that extends into the Opening 26,48 past the cutting edge 28,36 and is spaced from a centerline of the cutting edge 28,36 a distance slightly less than the thickness of the Wire 14. In this position, when the cutting surfaces 24 and 42 and cutting edges 28 and 36 have completed forming the circumferential cut in the insulation 17 to form the plug 20, the projections 302 on the stops 300 are positioned within the cut to provide a stop against movement of the plug 20 with the remainder of the wire 14 when the wire 14 is moved in the direction shown in FIG. 1(d). In addition, the stop 300 provides a locating function within the opening 50 defined by the cutting edges 28,36 to properly locate the wire 14 between the blades 10 and 12 and complete the circumferential cut in the insulation 17.

After the wire 14 is withdrawn from the blade assembly 1000, the blades 10 and 12 can be drawn away from one another to the position in FIGS. 1(a) and 2(a), where an additional length of wire 14 can be positioned between the blades 10 and 12 to sever the sheath 17 in manner previously described.

As can be understood in the above description and specifically with respect to FIGS. 3 and 8, each of the stripping blades 10, 12 include a guide surface 22,40 opposite a cutting surface 24,42, that each terminate at a cutting edge 28,36. Unlike prior stripping blade designs that include a cutting edge on each side of the opening that receives the wire to be cut, the movement of the stripping blades 10,12 relative to each other, and the consequent engagement of the wire 14 with the guide surfaces 22,40 and cutting surfaces 24,42 creates a "cyclonic" or rotational force that rotates the wiring 14 as it is cut by the surfaces 24,42 and edges 28,36 to form a circumferential cut into the insulating material 17, which can be a complete 360° cut into the insulation 17. The circumferential cut into the insulation material 17 minimizes the amount of insulating material 17 that remains uncut, both on the exposed surface 17' of the insulation 17 and between the exposed surface 17' and the core 19. In one embodiment, the blades 10,12 are configured to form a circumferential cut through all of the exposed surface 17' of the insulation 17, while leaving a predetermined amount of insulation 17 between the exposed surface 17' and the core 19 uncut. In another embodiment, the blades 10,12 can be configured to circumferentially cut through the entire insulation 17 down to a desired distance from the core 19, or all the way through the insulation 17 to the core 19. However, in all configurations of the blades 10,12 and depth of the resulting circumferential cut, the circumferential cut minimizes the uncut insulation 17 on the exposed surface 17' or within the insulation 17 that is necessarily torn during the stripping or removal process shown in FIG. 1(d) when the stops 300 hold the plug 20 in place while the remainder of the wire 14 is removed from the blades 10,12. By making the cut in this manner, the blades 10,12 enable the wiring 14 to be formed with a clean, exposed end 400 of the core 19 that easily be electrically engaged with a suitable electric or electronic device.

Various alternatives are contemplated as being within the scope of the following claims particularly pointing out and distinctly claiming the subject matter regarded as the invention.

What is claimed is:

1. A method for severing a portion of an insulating material sheath from a wire, the method comprising the steps of:
    a) providing a blade assembly including a first blade having a first cutting opening therein, the first opening including a first flat guide surface on one side of the first opening and a first cutting surface on the opposite side of the first opening, and a second blade including a second cutting opening therein, the opening including a second flat guide surface on one side of the second opening and a second cutting surface on the opposite side of the second opening;
    b) positioning a wire including an insulating material sheath thereon between the first blade and the second blade; and
    c) engaging the first blade and the second blade with the insulating material sheath, wherein the step of engaging the first blade and the second blade with the insulating material sheath simultaneously rotates and cuts the sheath.

2. A method for severing a portion of an insulating material sheath from a wire, the method comprising the steps of:
    a) providing a blade assembly including a first blade having a first cutting opening therein, the first opening including a first flat guide surface on one side of the first opening and a first cutting surface on the opposite side of the first opening, and a second blade including a second cutting opening therein, the opening including a second flat guide surface on one side of the second opening and a second cutting surface on the opposite side of the second opening;
    b) positioning a wire including an insulating material sheath thereon between the first blade and the second blade; and
    c) engaging the first blade and the second blade with the insulating material sheath,
    wherein the first cutting opening includes a first cutting edge connected to the first cutting surface and the first guiding surface, and the second opening includes a second cutting edge connected to the second cutting surface and the second guiding surface, and wherein the method further comprises the step of engaging the sheath within the first and second cutting edges after engaging the sheath with the first or second cutting surfaces and first or second guiding surfaces to complete the cut in the sheath and wherein the first and second cutting edges each include a stop, and wherein the method further comprises the steps of:
a) engaging the stops with the cut in the sheath; and
b) removing a severed portion of the sheath from the wire.

* * * * *